United States Patent
Garbagnati et al.

(10) Patent No.: US 6,782,688 B2
(45) Date of Patent: Aug. 31, 2004

(54) CHAIN WITH SEALS HAVING IMPROVED CHARACTERISTICS

(75) Inventors: Carlo Garbagnati, Castello Brianza (IT); Massimiliano Fumagalli, Missaglia (IT)

(73) Assignee: Regina S.I.C.C. S.p.A., Milan (IT)

( * ) Notice: Subject to any disclaimer, the term of this patent is extended or adjusted under 35 U.S.C. 154(b) by 0 days.

(21) Appl. No.: 10/370,457

(22) Filed: Feb. 24, 2003

(65) Prior Publication Data

US 2003/0167749 A1 Sep. 11, 2003

(30) Foreign Application Priority Data

Mar. 8, 2002 (IT) .................................. MI20020130 U

(51) Int. Cl.[7] ............................................. F16G 13/02
(52) U.S. Cl. ....................... 59/5; 59/8; 59/78; 474/207
(58) Field of Search ............................... 59/4, 5, 8, 78; 474/207

(56) References Cited

U.S. PATENT DOCUMENTS

| 5,459,993 | A | * | 10/1995 | Kuriyama et al. | ............... 59/4 |
| 5,468,376 | A | * | 11/1995 | Bates | ............... 59/4 |
| 5,787,700 | A | * | 8/1998 | Tanaka | ............... 59/5 |
| 5,943,855 | A | * | 8/1999 | Morimoto et al. | ............... 59/5 |

* cited by examiner

*Primary Examiner*—David B. Jones
(74) *Attorney, Agent, or Firm*—Jacobson Holman PLLC

(57) ABSTRACT

A chain has links made up of pairs of outer and inner plates connected respectively by pins and bushes fitted on the pins and projecting through the inner plates. Between the bush and its pin there is a lubricated interface and on each end of the bush is mounted and compressed between an inner and an outer plate an annular seal. The seal when not compressed between the plates is generically shaped with a lip projecting towards the axis of the seal. With the chain assembled the lip tends to wedge between the bush and the outer plate to reduce the wear on the seal.

9 Claims, 2 Drawing Sheets

CHAIN WITH SEALS HAVING IMPROVED CHARACTERISTICS

BACKGROUND OF THE INVENTION

The present invention relates to a transmission and/or conveyance chain of the type with lubricant sealed by ring seals.

Transmission and/or conveyance chains having pins on which are bushes sealed at the ends by O-rings compressed between the plates of the chain to retain grease or lubricating fluid are known. Chains of this type are used for example in the motorcycle field.

One of the problems of the above mentioned type of chain is the life of the seal rings which when they begin to wear allow lubricant to come out of the joints. Lubrication thus becomes insufficient and the joints wear rapidly to make the chain unserviceable.

Another problem with prior art chains is that during assembly the known seals tend to be "pinched" between bushes and plates of the chain. Shaped seals also tend to be reversed or get stuck during assembly.

The general purpose of the present invention is to remedy the above mentioned shortcomings by making available an innovative chain of the type with a supply of lubricant which thanks to an innovative shape of the seals allows recovery of play and keeps hydraulic seal of the lubricant for a long time.

SUMMARY OF THE INVENTION

In view of this purpose it was sought to provide in accordance with the present invention a chain with link pairs made up of outer and inner plates connected respectively by pins and bushes fitted on the pins and projecting through the inner plates with there being between the bush and its pin a lubricated interface and on each end of the bush there being mounted and compressed between an inner and an outer plate an annular seal characterized in that the seal when not compressed between the plates is generically shaped with a lip projecting towards the axis of the seal with said lip tending with the chain assembled to wedge between the bush and the outer plate in such a manner as to recover the wear on the seal.

BRIEF DESCRIPTION OF THE DRAWINGS

To clarify the explanation of the innovative principles of the present invention and its advantages compared with the prior art there is described below with the aid of the annexed drawings a possible embodiment thereof by way of non-limiting example applying said principles. In the drawings.

DETAILED DESCRIPTION OF THE INVENTION

Figure 1:
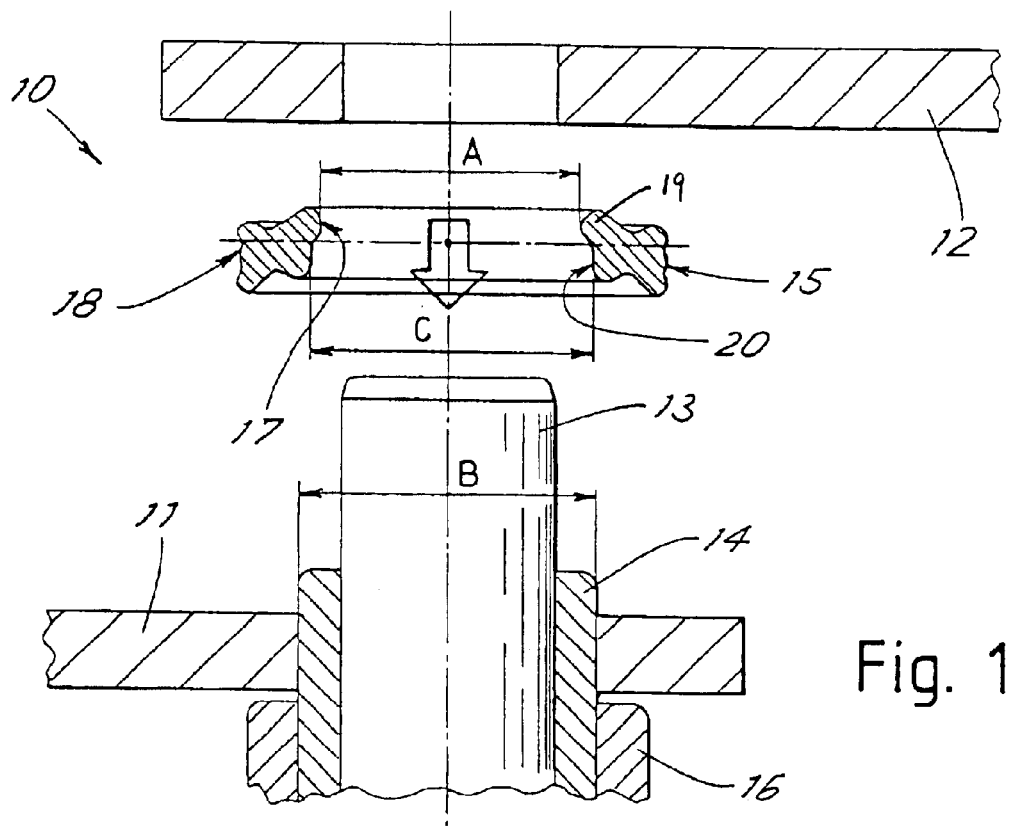
FIG. 1 shows a diagrammatic cross section view of a pin zone of a chain in accordance with the present invention before assembly.

With reference to the figures, FIG. 1 shows a disassembled chain designated as a whole by reference number 10 realized in accordance with the present invention. Only one zone near the end of a pin is shown.

The chain has links made up of pairs of plates 11, 12 respectively connected by pins 13 and bushes 14 fitted on the pins and protruding through the inner plate 11. Between the bush and the respective pin is thus identified a lubricated interface. On each end of the bush protruding from the inner plate is fitted and compressed between the plates an annular seal 15. On the bushes 14 between the inner plates 11 are fitted rollers 16. Bushes and pins are force-fitted through the respective plates.

As may be seen in FIG. 1, the uncompressed seal between the plates is shaped generally to have a lip 19 projecting towards the outer plate and towards the axis of the seal. This lip 19 is rounded and in particular defines a diameter A clearly smaller than the diameter B of the bush (for example A=6.4 mm, B=7.44 mm). The lip is rounded in an arc of at least 90°.

Advantageously the seal also has the shape of a Belleville washer with face 17 radially innermost which is axially offset from the outer face 18. In particular the seal has its innermost face 17 axially offset towards the outer plate 12.

In the advantageous embodiment shown the seal has all the sharp edges of the section rounded and realized generally projecting. In addition, the innermost face 17 of the seal is realized tapered for a first mouth section 20 for forced fitting on the bush 14. To allow forced coupling of the seal on the bush the tapered zone has diameter C slightly smaller than diameter B (for example B=7.44 mm, C=7 mm). The outer edge of the bush is also rounded.

The tapered zone facilitates fitting of the bush and eliminates the risk of pinching.

Figure 2:
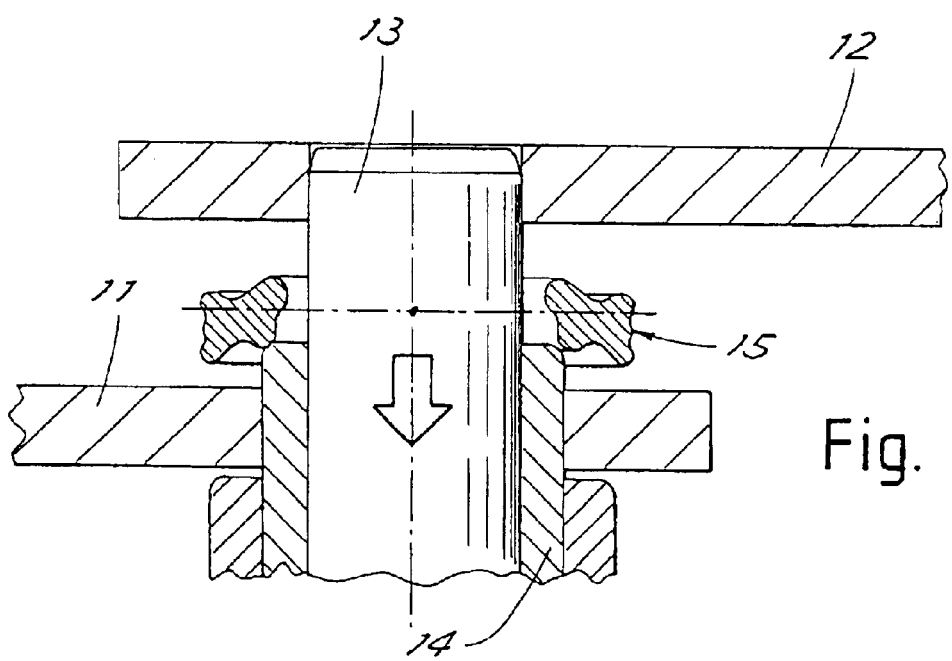
FIGS. 2 and 3 show views similar to FIG. 1 but in two successive intermediate phases of assembly of the chain.

FIG. 2 shows a first fitting phase in which the seal is rested on the bush. In a later phase (FIG. 3) approach of the outer plate and compression of the seal are begun and the seal is thrust to expand outwardly.

Figure 4:
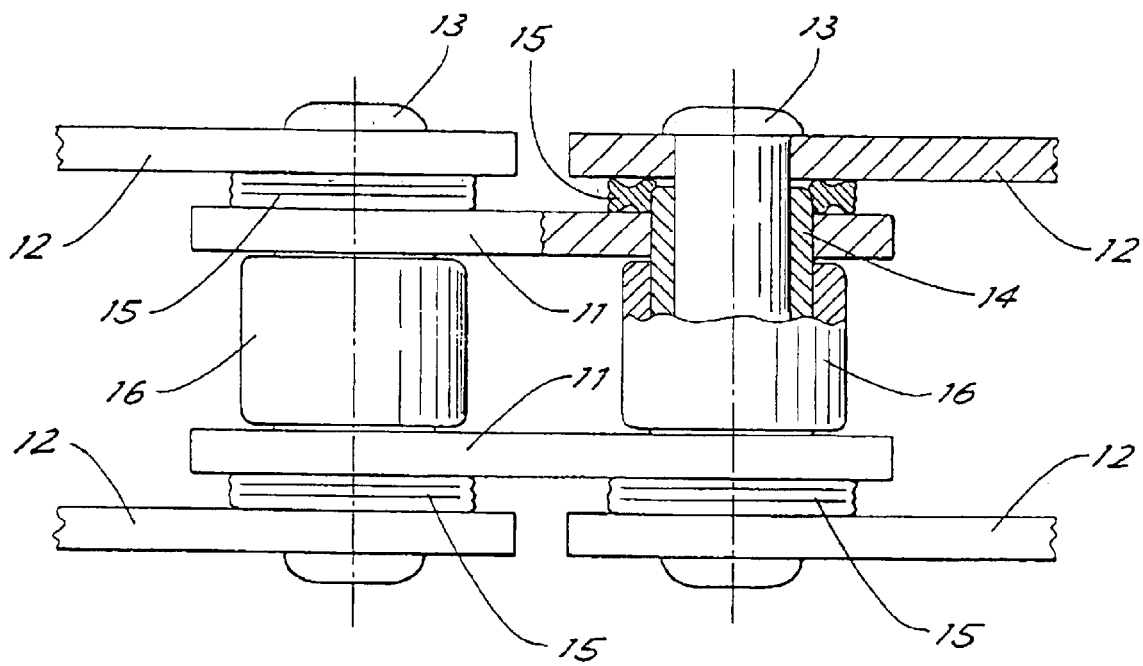
FIG. 4 shows a view of a link of the chain of FIG. 1 in assembled condition.

FIG. 4 shows the assembled chain with the seal adequately compressed to ensure seal. The lip 19 lies thrust elastically toward the residual interstice between the outer plate and the bush.

Figure 3:
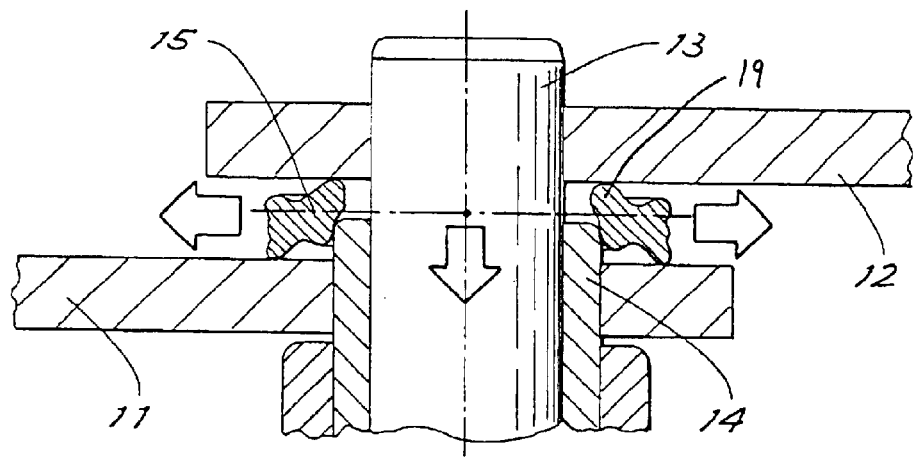

Naturally before reaching the phase shown in FIG. 3 suitable lubricant is inserted in the space between the pin 13 and the bush 14.

The chain equipped with sealing rings in accordance with the present invention is benefited by a wear recovery action due to the fact that the projecting lip 19 tends to gradually increase its wedging between the bush and the plate as wear of the sealing ring increases while continuing to ensure the seal even in case of high wear caused by prolonged use. With the Belleville spring shape there is also an added elastic expansion effect. Leakage of lubricant is thus greatly retarded and chain life is therefore extended.

In addition the shaping of the seal gives greater flexibility of the seal itself when it is compressed between the plates with respect to known seals such as for example the conventional O-rings with round cross section. This was found to give the chain better running.

Pinching and reversal of the seal are also avoided. It should also be noted that, as will be clear to those skilled in the art, the shape of the gasket with the lip protruding from one side and the tapered fitting inducement allow easy assembly of the chain even by automatic machines.

As may be seen again in FIG. 4, in the advantageous embodiment shown the seal compressed under normal conditions between the plates is distorted to form a cross section generally in the form of the letter H. Since the H is given by the distortion of an initial shape generally like the letter Z, there is an excellent play recovery effect between the plates.

It is now clear that the predetermined purpose has been achieved.

Naturally the above description of an embodiment applying the innovative principles of the present invention is given by way of non-limiting example of said principles within the scope of the exclusive right claimed here. For example the chain could comprise known means of storage and distribution of lubricant inside the pins.

What is claimed is:

1. Chain comprising links made up of pairs of outer and inner plates connected respectively by pins and bushes fitted on the pins and protruding through the inner plates, a lubricated interface located between the pin and the bush fitted on the pin, an annular seal mounted on each end of the bushes and compressed between an inner and an outer plate to physically contain lubricant in said lubricated interface, with the seal, when not compressed between the plates being shaped with a lip projecting towards an axis of the seal and said lip, when the chain is assembled, being elastically thrust to sealingly wedge in an interstice between the bush and the outer plate in such a manner as to reduce wear of the seal.

2. Chain in accordance with claim 1, wherein said lip, when not compressed, also projects towards the outer plate.

3. Chain in accordance with claim 1, wherein, when not compressed, the seal is shaped with a radially innermost face offset axially with respect to an outer face.

4. Chain in accordance with claim 1, wherein said lip is rounded in cross section in an arc of at least 90°.

5. Chain in accordance with claim 1, wherein the seal has all edges in cross section rounded.

6. Chain in accordance with claim 5, wherein in cross section, the seal has projecting edges.

7. Chain in accordance with claim 1, wherein an innermost face of the seal is tapered at a first mouth section for forced fitting on the bush.

8. Chain in accordance with claim 1, wherein the seal is compressed between the plates to form a cross section of a letter H.

9. Chain in accordance with claim 1, wherein the bush has ends with a rounded outer edge.

* * * * *